US009473953B2

(12) United States Patent
Palanichamy et al.

(10) Patent No.: US 9,473,953 B2
(45) Date of Patent: Oct. 18, 2016

(54) ROAMING DETECTION AND SESSION RECOVERY DURING VMM-RC

(71) Applicant: AetherPal Inc., South Plainfield, NJ (US)

(72) Inventors: Ranjithkumar Palanichamy, Piscataway, NJ (US); Calvin Charles, Piscataway, NJ (US); Deepak Gonsalves, Bridgewater, NJ (US)

(73) Assignee: AETHERPAL INC., South Plainfield, NJ (US)

( * ) Notice: Subject to any disclaimer, the term of this patent is extended or adjusted under 35 U.S.C. 154(b) by 113 days.

(21) Appl. No.: 13/842,922

(22) Filed: Mar. 15, 2013

(65) Prior Publication Data
US 2013/0260738 A1    Oct. 3, 2013

Related U.S. Application Data

(60) Provisional application No. 61/617,868, filed on Mar. 30, 2012.

(51) Int. Cl.
*H04W 24/02* (2009.01)
*H04W 24/08* (2009.01)
*H04W 8/18* (2009.01)
*H04W 8/24* (2009.01)

(52) U.S. Cl.
CPC ............ *H04W 24/02* (2013.01); *H04W 24/08* (2013.01); *H04W 8/18* (2013.01); *H04W 8/24* (2013.01)

(58) Field of Classification Search
CPC ....... H04W 24/02; H04W 4/02; H04W 8/24; H04W 24/08; H04W 8/18
See application file for complete search history.

(56) References Cited

U.S. PATENT DOCUMENTS

| | | | | |
|---|---|---|---|---|
| 4,996,715 A | * | 2/1991 | Marui | ............... H04M 1/72516 455/421 |
| 5,563,882 A | * | 10/1996 | Bruno | ................... H04M 3/567 348/14.09 |
| 5,708,820 A | * | 1/1998 | Park et al. | ..................... 713/323 |
| 5,995,829 A | | 11/1999 | Broderick | |
| 5,999,521 A | | 12/1999 | Thompson | |
| 6,047,071 A | | 4/2000 | Shah | |

(Continued)

FOREIGN PATENT DOCUMENTS

| | | |
|---|---|---|
| EP | 1429569 | 12/2003 |
| EP | 1921875 B1 * | 11/2011 |
| WO | WO2005001665 | 1/2005 |

OTHER PUBLICATIONS

Anonymous, "SyncML notification initiated session", Internet Citation, XP002462105, URL:http://www.openmobilealliance.org/tech/affiliates/syncml/syncml_dm_notification_v11_20020215.pdf, (Dec. 12, 2007).

(Continued)

*Primary Examiner* — Qun Shen
(74) *Attorney, Agent, or Firm* — Volpe and Koenig, P.C.

(57) ABSTRACT

Apparatus and method may include a control center system operable to enable remote control of wireless handheld devices based upon the establishment of dedicated communication channels with the wireless device and employing communication protocols to facilitate display capture, key and touch input simulation, and collect device parameters to analyze and compare with pre-defined parameters and generate a standards deviation report viewable by an authorized user.

29 Claims, 12 Drawing Sheets

(56) References Cited

U.S. PATENT DOCUMENTS

| | | | |
|---|---|---|---|
| 6,122,502 A * | 9/2000 | Grundvig et al. | 455/414.1 |
| 6,144,849 A | 11/2000 | Nodoushani et al. | |
| 6,148,197 A | 11/2000 | Bridges et al. | |
| 6,201,964 B1 | 3/2001 | Tung et al. | |
| 6,378,088 B1 | 4/2002 | Mongan | |
| 6,516,188 B1 | 2/2003 | New et al. | |
| 6,564,055 B1 | 5/2003 | Hronek | |
| 6,615,038 B1 | 9/2003 | Moles et al. | |
| 6,625,451 B1 | 9/2003 | LaMedica, Jr. et al. | |
| 6,684,359 B2 | 1/2004 | Noy | |
| 6,738,599 B2 * | 5/2004 | Black et al. | 455/62 |
| 6,832,373 B2 | 12/2004 | O'Neill | |
| 6,853,623 B2 * | 2/2005 | Nederveen et al. | 370/250 |
| 6,907,546 B1 | 6/2005 | Haswell et al. | |
| 6,925,405 B2 | 8/2005 | Adir et al. | |
| 6,959,433 B1 | 10/2005 | Morales, Jr. et al. | |
| 6,970,719 B1 | 11/2005 | McConnell et al. | |
| 7,032,212 B2 | 4/2006 | Amir et al. | |
| 7,194,264 B2 | 3/2007 | Li et al. | |
| 7,286,802 B2 | 10/2007 | Beyme et al. | |
| 7,716,319 B2 * | 5/2010 | Kataoka et al. | 709/223 |
| 7,805,719 B2 | 9/2010 | O'Neill | |
| 7,986,947 B2 * | 7/2011 | Hamasaki et al. | 455/432.1 |
| 8,171,521 B2 * | 5/2012 | Choi et al. | 726/1 |
| 8,365,018 B2 * | 1/2013 | McIntosh et al. | 714/23 |
| 8,432,278 B2 * | 4/2013 | Slepov | 340/540 |
| 8,707,432 B1 * | 4/2014 | Rathi | H04L 63/1408 726/22 |
| 8,977,263 B2 | 3/2015 | Chin | H04W 4/003 455/415 |
| 9,185,730 B2 * | 11/2015 | Zhao | H04W 76/02 |
| 9,338,663 B2 * | 5/2016 | Gillot | H04W 24/00 |
| 2003/0065738 A1 | 4/2003 | Yang et al. | |
| 2003/0066065 A1 | 4/2003 | Larkin | |
| 2003/0101246 A1 | 5/2003 | Lahti | |
| 2003/0156549 A1 * | 8/2003 | Binder | H04L 12/2697 370/252 |
| 2003/0204726 A1 | 10/2003 | Kefford et al. | |
| 2004/0098715 A1 | 5/2004 | Aghera et al. | |
| 2004/0184431 A1 * | 9/2004 | Park | H04L 12/2803 370/346 |
| 2005/0193098 A1 | 9/2005 | Khandpur et al. | |
| 2005/0221819 A1 * | 10/2005 | Patel et al. | 455/432.1 |
| 2005/0227688 A1 | 10/2005 | Li et al. | |
| 2006/0015404 A1 | 1/2006 | Tran | |
| 2006/0015626 A1 | 1/2006 | Hallamaa et al. | |
| 2006/0075284 A1 | 4/2006 | Skan | |
| 2006/0130046 A1 | 6/2006 | O'Neill | |
| 2006/0136922 A1 | 6/2006 | Zimberg et al. | |
| 2006/0248522 A1 | 11/2006 | Lakshminarayanan et al. | |
| 2007/0005647 A1 | 1/2007 | Cugi et al. | |
| 2007/0106564 A1 | 5/2007 | Matotek et al. | |
| 2007/0299940 A1 | 12/2007 | Gbadegesin et al. | |
| 2008/0098380 A1 | 4/2008 | Klusmeyer | |
| 2008/0172736 A1 | 7/2008 | Barr et al. | |
| 2008/0209193 A1 | 8/2008 | Zhang et al. | |
| 2009/0164602 A1 | 6/2009 | Kies et al. | |
| 2009/0177882 A1 | 7/2009 | Saran et al. | |
| 2009/0221307 A1 | 9/2009 | Wolak et al. | |
| 2009/0228966 A1 | 9/2009 | Parfene et al. | |
| 2010/0070649 A1 | 3/2010 | Ng | |
| 2010/0093319 A1 * | 4/2010 | Sherman | H04M 3/42178 455/14.1 |
| 2010/0151823 A1 | 6/2010 | Dagorn et al. | |
| 2010/0210259 A1 * | 8/2010 | Morales Barbosa | 455/422.1 |
| 2010/0217780 A1 | 8/2010 | Erola et al. | |
| 2010/0218012 A1 * | 8/2010 | Joseph | G06F 1/3203 713/310 |
| 2013/0054969 A1 | 2/2013 | Charles et al. | |
| 2013/0102306 A1 * | 4/2013 | Sachanandani | H04L 63/0853 455/432.2 |
| 2013/0227096 A1 * | 8/2013 | Eriksson | H04L 65/4038 709/222 |

OTHER PUBLICATIONS

Kovacs, E. et al, "Integrating mobile agents into the mobile middleware", Internet article: http://download.springer.com/static/pdf/630/art%253A10.1007%252FBF01324936.pdf?auth66=1353975026_642152af85f26d0903f4dc786bdf1416&ext=.pdf>, p. 68-74, (Retrieved from Internet Nov. 26, 2012).

Caporuscio, M. et al, "Design and evaluation of a support service for mobile, wireless publish subscribe applications", 2003 IEEE, Internet article: http:ieeexplore.ieee.org/stamp/stamp.jsp?tp=&arnumber=1265521, 29:12, p. 1059-1071, (Retrieved from Internet Nov. 26, 2012).

* cited by examiner

ROAMING DETECTION AND SESSION RECOVERY DURING VMM-RC

PRIORITY CLAIM

In accordance with 37 C.F.R. §1.76, a claim of priority is included in an Application Data Sheet filed concurrently herewith. Accordingly, the present invention claims priority under 35 U.S.C. §§119(e), 120, 121, and/or 365(c) to U.S. Provisional Patent Application No. 61/617,868, entitled "ROAMING DETECTION WHILE REMOTELY MANAGING MOBILE DEVICES", filed on Mar. 30, 2012. The contents of which the above referenced application is incorporated herein by reference in its entirety.

FIELD OF INVENTION

The present invention relates to mobile wireless communication devices, systems, networks, methods of operation, and knowledgebase and in particular to a roaming detection while remotely managing mobile devices.

BACKGROUND OF THE INVENTION

Wireless handhelds are increasingly becoming more powerful and multi-functional with advancements in hardware and operating systems components, thus providing application developers a common set of programming interfaces or APIs to create rich interactive applications. These applications are either pre-installed prior to commercial shipment or downloaded over-the-air by the customer. Due to the varied complexity of these "smart" device and the applications that execute within them, customer seeks operator's support to troubleshoot their devices.

The customer care organization may require troubleshooting software to provide effective customer support. It may be advantageous to provide an apparatus that provides remote control and diagnostic capabilities to the customer care for effective troubleshooting. But even if the operator provides such tools the question that remains to be solved is the data costs that could incur for the user while they are roaming.

SUMMARY OF INVENTION

Disclosed is a method to enable remote control of wireless handheld devices based upon the establishment of dedicated communication channels with the wireless device and employing communication protocols to facilitate display capture, key and touch input simulation, and collect device parameters to analyze and compare with pre-defined parameters and generate a standards deviation report viewable by an authorized user. A device client is resident on the mobile device non-volatile memory and is operable by the end user to invoke the application to request remote control feature.

An objective of the instant invention is to address the high roaming charge when performing remote troubleshooting of a mobile device.

Another objective of the instant invention is to allow the customer care representative to know if the user is roaming or not before starting a virtual mobile management remote control session to avoid any additional data roaming charges that the user could incur.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
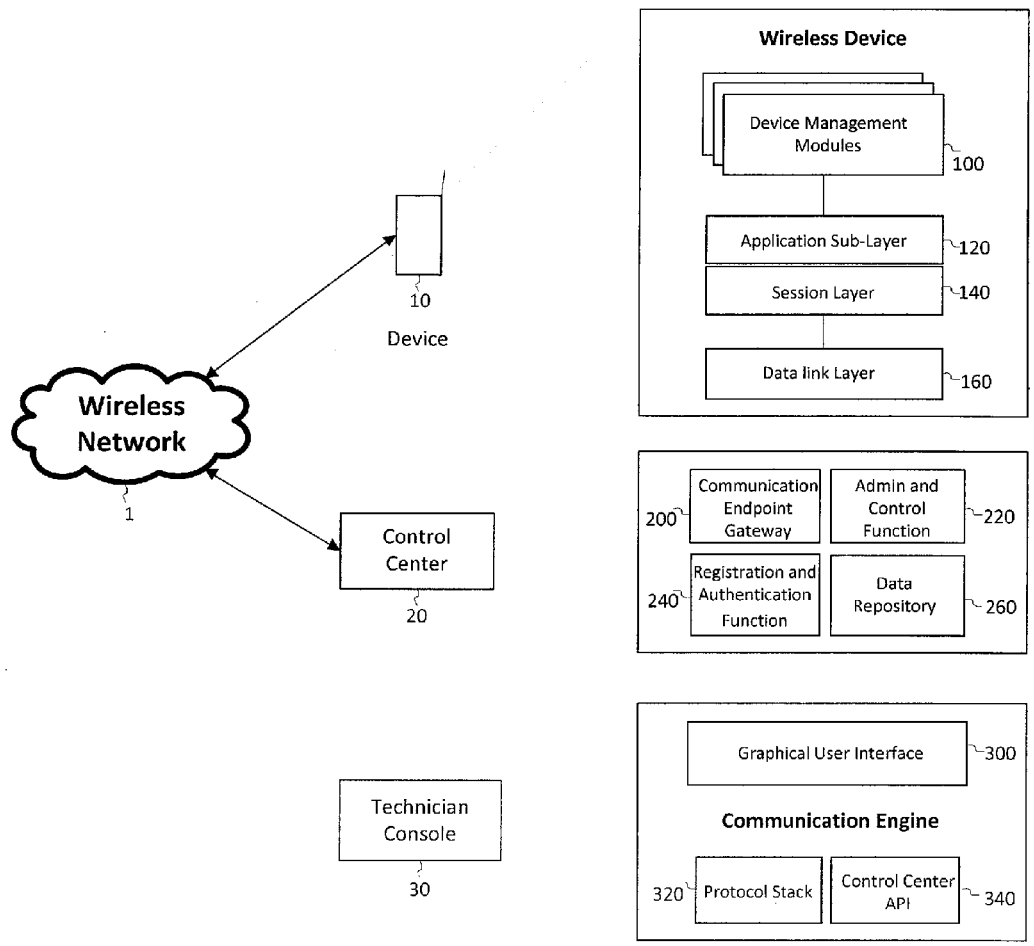
FIG. 1 illustrates the overall architecture of the Virtual Mobile Management (VMM) system.

Referring to FIG. 1, set forth is the overall architecture of the Virtual Mobile Management (VMM) system. For the purpose of readability, Blocks number starting with 1xx relates to Device [10] and it components; 2xx under refer to Control Center [20] and its components; 3xx under relate to Technician Console [30] and its components.

The Virtual Mobile Management Remote Control (VMM-RC) is a powerful tool designed to be used by the customer care representatives to remotely view and control the mobile devices. In a preferred embodiment, the key components of the VMM-RC system include: Technician Console [30] where care agents interact with the remote devices [10] through Control Center [20] services that mediate communication between the Technician Console [30] and the remote devices [10].

The Control Center [20] comprises the following elements:
Communication Endpoint Gateway or CEG [200]
Admin and Control Function or ACF [220]
Registration and Authentication Function or RAF [240]
Data Repository [260]

The primary responsibility of CEG [200] is to manage and mediate sessions. The server provides communication endpoints between device [10] and Technician Console [30]. This allows for multiple requests to be serviced within one session from multiple instances of [30]. The CEG or [200] provides a consistent manner of device connection and Tool service in a system with heterogeneous devices running different operating systems. The CEG or [200] provides load balancing across multiple Connection Handlers on each Communication End Point Gateway Server in order to minimize single point of failure.

Figure 2:
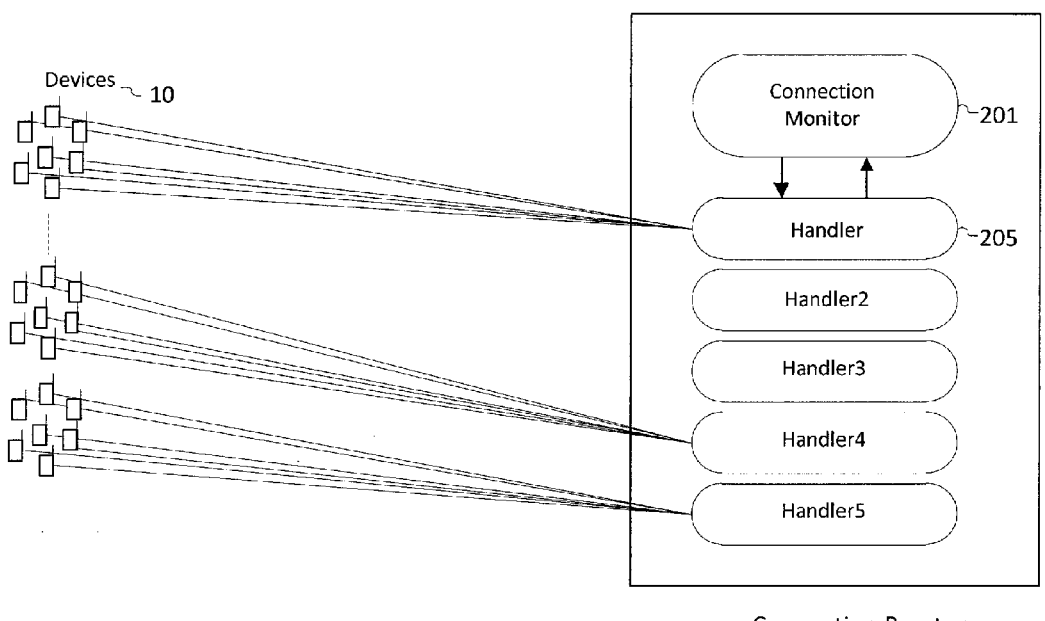
FIG. 2 illustrates the details of Communication Endpoint Gateway.

FIG. 2, shows components of CEG [200] in detail. CEG is comprised of two components; the Connection Monitor and the Connection Handler [205].

The primary function of [201] is: Create and manage multiple instances of [205]; Creates Session ID for new connection requests; Monitors all the scheduled and existing sessions. The primary function of [205] is: authenticate inbound connections; mediate VMM session traffic between device [10] and Technician Console [30].

Figure 3:
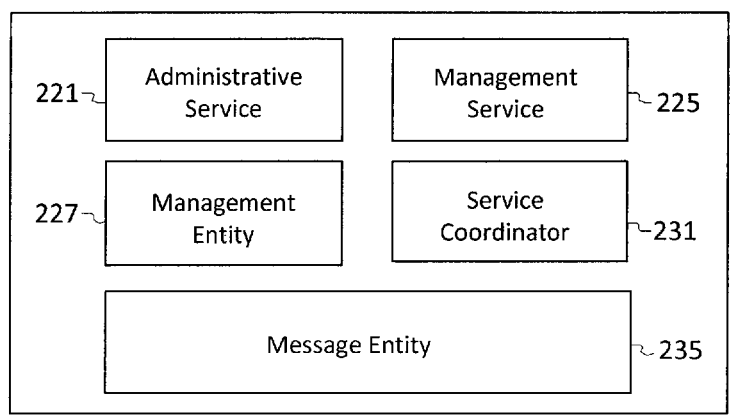
FIG. 3 illustrates the details of Admin and Control Function.

FIG. 3 shows the details of ACF [220] which is responsible in the administration, management and authorization of communication between the Control Center [20] and the devices [10]. It comprises of the following service functions.

The Administrative Service [221] is designed to be a central administrative entity of the entire virtual mobile management system. Through this service, system administrators perform administration, management and instrumentation servers within the system, create and maintain multiple tenants, assign tenant administrator roles, etc.

The Management Service [225] provides the operational endpoint to the system. The primary functions of Management Service are: Load distribution among the CEG, management of device registration; Administration of devices; Administration of users, zones, policies, roles, etc.; and Session Queuing.

The Management Entity [227] component is responsible in providing the Management service [225] with an in-memory data store for key operational data such as ACL, user/group/zone structures, etc.

The Service Coordinator [231] coordinates the communication between various elements within the System. It provides the database interface to the RAF [240] in the Control Center. All services register themselves with this service. This service is responsible for service discovery.

Figure 4:
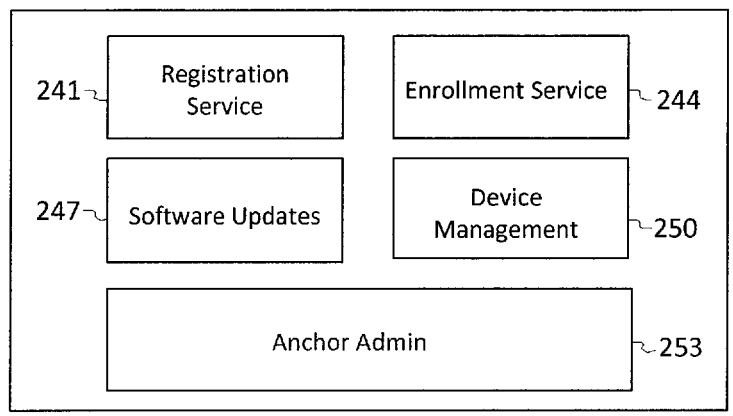
FIG. 4 illustrates the details of Routing and Authentication Function.

FIG. 4 shows the components of RAF [240] in detail; RAF [240] provides a single point of entry for all devices for enrollment and authentication services during VMM-RC session. It comprises of the following components:

Registration Service [241]: During Auto-Enrollment, devices are required to register themselves with this service, prior to enrolling themselves.

Enrollment Service [244]: This service is responsible to enroll registered devices with the system. The Enrollment process is defined in detail in the later sections of the document.

Software Updates [247]: This service manages the various client packages in the system. Devices connect to this service to request for client update. If an update is available, the service will provide the appropriate client download link.

Device Management. [250]: This service provides the enrolled devices an interface to update its parameters in the system such as MDN when the device detects a change. AnchorAdmin [253]: This service provides the administration component.

Data Repository [260] is the data warehouse that stores the information about the VMM-RC Mobile devices, server configuration, tasks and status settings. These data bases are pivotal to configure and update managed devices and server components. It is also responsible to maintain the user login information as well as device authentication information.

Figure 5:
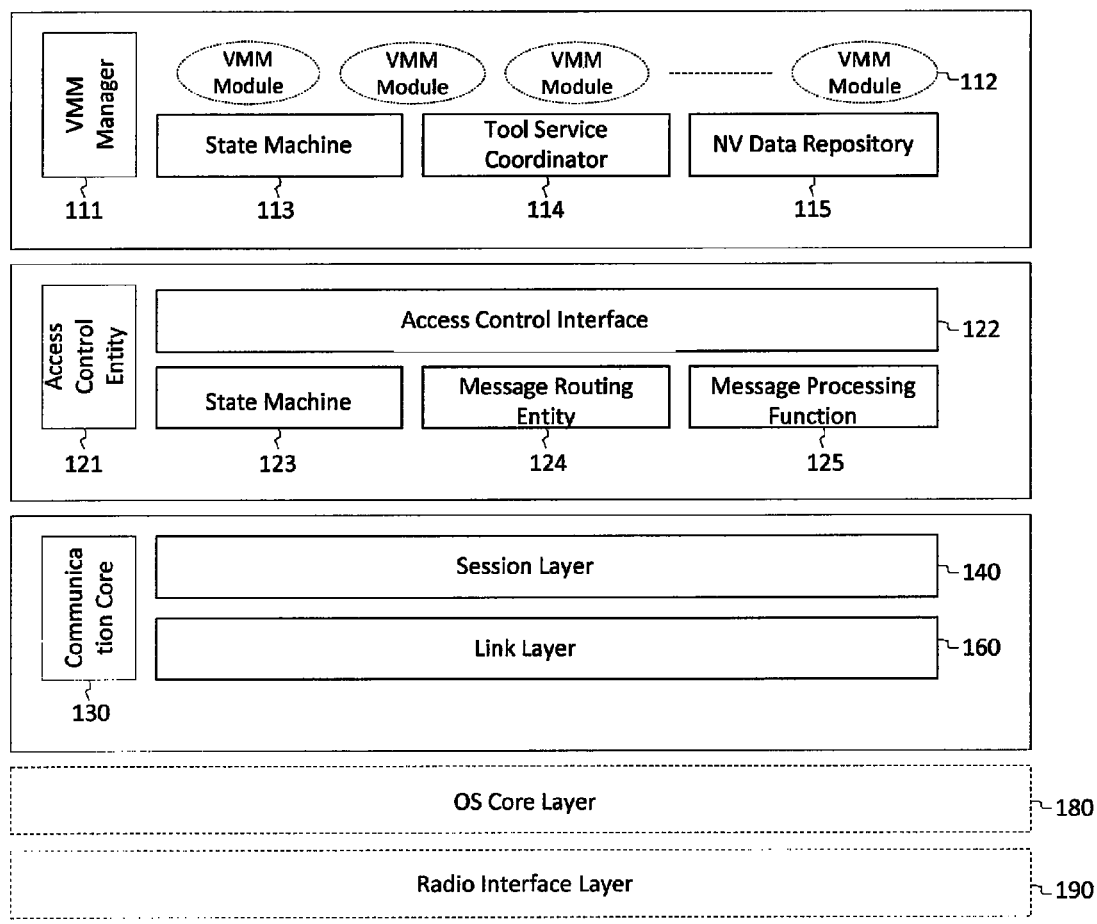
FIG. 5 illustrates the VMM client protocol architecture of Device.

FIG. 5 illustrates the VMM client protocol architecture of Device [10]. The VMM Client architecture comprises of the following protocol layers and function blocks VMM Manager [111] this layer encapsulates functional entities that provide the communication and protocol frameworks necessary to client services. This layer primarily handles bearer plane traffic. The following functional entities are part of [111].

VMM Modules [112] provide a multitude of tool services. Tool Services are grouped together that exhibit common functionality such as Remote Control, File Manager, Device Management, etc.

State Machine [113], each tool service maintains an instance of the state machine. A State Machine defines a set of shared states that the tool service on the device application shares with the server.

Tool Service Coordinator [114] maintains a collection of active tool service instances that are currently being serviced by the VMM application. This entity maintains the lifetime of all Tool Services, and is responsible in creating and destroying Tool Services.

NV Data Repository [115] authentication and authorization specific data that is shared between the VMM application and the server is maintained within the NV data repository. This data repository also serves the purpose of maintaining Tool Service configuration as well as VMM configuration data.

Access Control Entity [121] layer provides a set of functions to the Tool Services to communicate with the Control Center [20]. It provides in the encapsulation of messages before forwarding it to the Communication Core [130]. This layer is responsible to invoke an instance of the Communication Core [130] layer and provides a state machine [123] that defines the state of the VMM application.

Access Control Interface [122] provides a set of standard Application Programmer Interface or API to the Tool Services. These APIs provide a consistent communication platform to facilitate both synchronous as well as asynchronous communication.

State Machine [123] identifies the overall state of the VMM application. State transitions within the ACE State Machine triggers events that are handled by the VMM layer. The states are Open and Closed. Traffic flows through the ACI layer only in the State Open.

Message Routing Entity [124] is responsible for routing all signal messages, destined to Tool Services to the respective event handlers.

Message Processing Function [125] is a signal message pre-processor. This entity receives signal messages from the Session Layer destined towards Tool Services. It de-frames these messages prior to forwarding it to the Message Routing Entity to apply routing rules. Messages that are destined for the server from Tool Services are encapsulated here.

Communication Core [130] Layer is responsible to set up and maintain a dedicated communication channel with the Control Center [20]. This layer provides the necessary framework to transport messages between the upper layers and the Control Center [20]. It provides message encapsulation, framing, fragmentation and packet re-construction of Tool Service messages.

Figure 6:
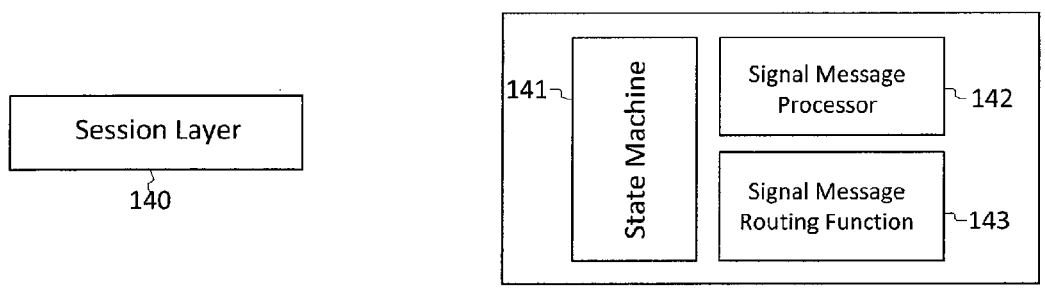
FIG. 6 illustrates the details of VMM Client Session Layer.

The communication core [130] comprises of the following sub-layers. FIG. 6 is a detail of Session Layer [140]. The session layer maintains a set of shared state between the Communication Endpoint Gateway (CEG) [200] and the VMM Application Module [112]. The session layer packets encapsulate signal messages that are transported between the CEG [200] and the VMM Module [112]. Each message within the session layer packet defines the source and destination to which the signal messages are to be delivered. The session layer consists of the following entities:

State Machine [141] maintains a state within a pre-defined set of shared state between the application and the CEG [200]. State changes within the state machine trigger the execution of state transition procedures within the VMM Application Module [112].

Signal Message Processor [142] is responsible to encapsulate and process signal messages that are transmitted between the CEG [200] and the Application Module [112]. This entity is also responsible in influencing the state transition within the state machine by altering its state. Signal messages destined to VMM modules are forwarded to the Signal Message Routing Function.

Signal Message Routing Function [143] is responsible with the task of forwarding signal messages to the appropriate destination. Signal messages destined to VMM modules are directly forwarded to the VVM Tool Service Coordinator [114]. Signal messages destined to the CEG [200] are forwarded to the link layer [160].

Referring to FIG. 5, another component is the Link Layer [160] which is responsible to establish and maintain a dedicated communication channel between the client and the CEG [200]. The Link Layer encapsulates all messages within its frame prior to forwarding it to the network. Packets that are received by the Link Layer from the network are re-constructed and de-framed prior to forwarding it to the upper layer. This layer checks for message integrity.

Figure 7:
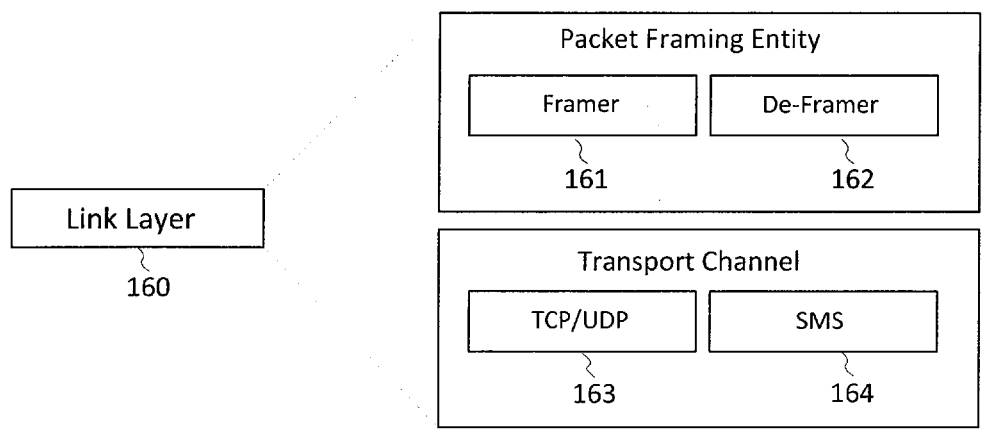
FIG. 7 illustrates the details of the VMM Client Link Layer.

The following components form the Link Layer [160] as in FIG. 7, (Detail of Link Layer in FIG. 5). The Packet Framing Entity [161,162] is responsible to encapsulate messages in Link Layer frames. These frames are then forwarded to the Transport Channel, to be forwarded to the network layer. The packet framing entity comprises of Framer [161] and the De-Framer [162]. When a network packet is received by the Packet Framing Entity, it inspects the packet and verifies the integrity of the packet. Malformed packets are silently discarded.

The Transport Channel [163,164] binds to the appropriate transport layer of the underlying operating system, which is dependent upon the VMM Tool Service. It is responsible to forward messages to the network layer and receives messages from the network layer. It provides notification to the upper layer of the state of the network layer through asynchronous events.

Figure 8:
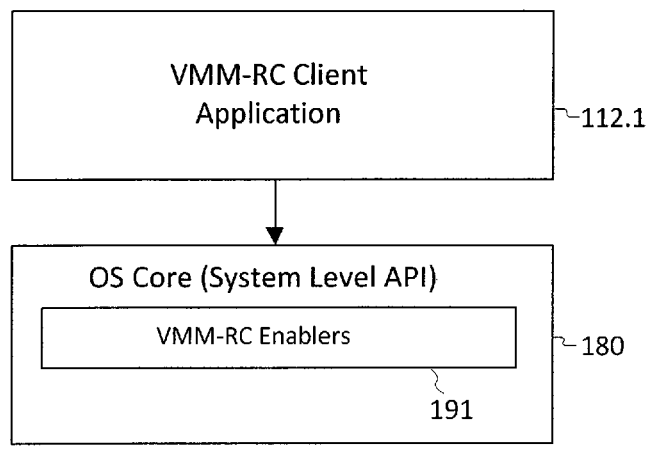
FIG. 8 is a schematic diagram of Virtual Mobile Management-Remote Control VMM-RC on Client side.

FIG. 8 shows is a schematic diagram of Virtual Mobile Management-Remote Control VMM-RC on Client side. The VMM-RC client Application [112.1] on the device provides Core Tool services, to manage the remote control session, collect the desired device diagnostics, provide self-care support for remote session activation and manage security protocol. The VMM-RC client application module [112.1] is one of the many VMM Client Application modules of [112]

The key features that are required by VMM-RC application to manage devices remotely include: Display Capture, this method involves the capturing of the device screen; Key event Injection, this method involves the injection of key events into the device screen; Touch event injection, this method involves the simulation of touch events on the device screen; and Device Information, getting the device information like network, power status, MNC, MCC, IMEI, IMSI, ESN, battery level of the smart phone etc., this is of value to the remote technician.

The VMM-RC Enabler [191] performs the key functions: Intercepts all the SMS; keeps the VMM-RC Application to its current version; if the VMM-RC Application is removed accidentally the VMM-RC Enabler shall connect to the server and download the application and installs the same.

Figure 9:
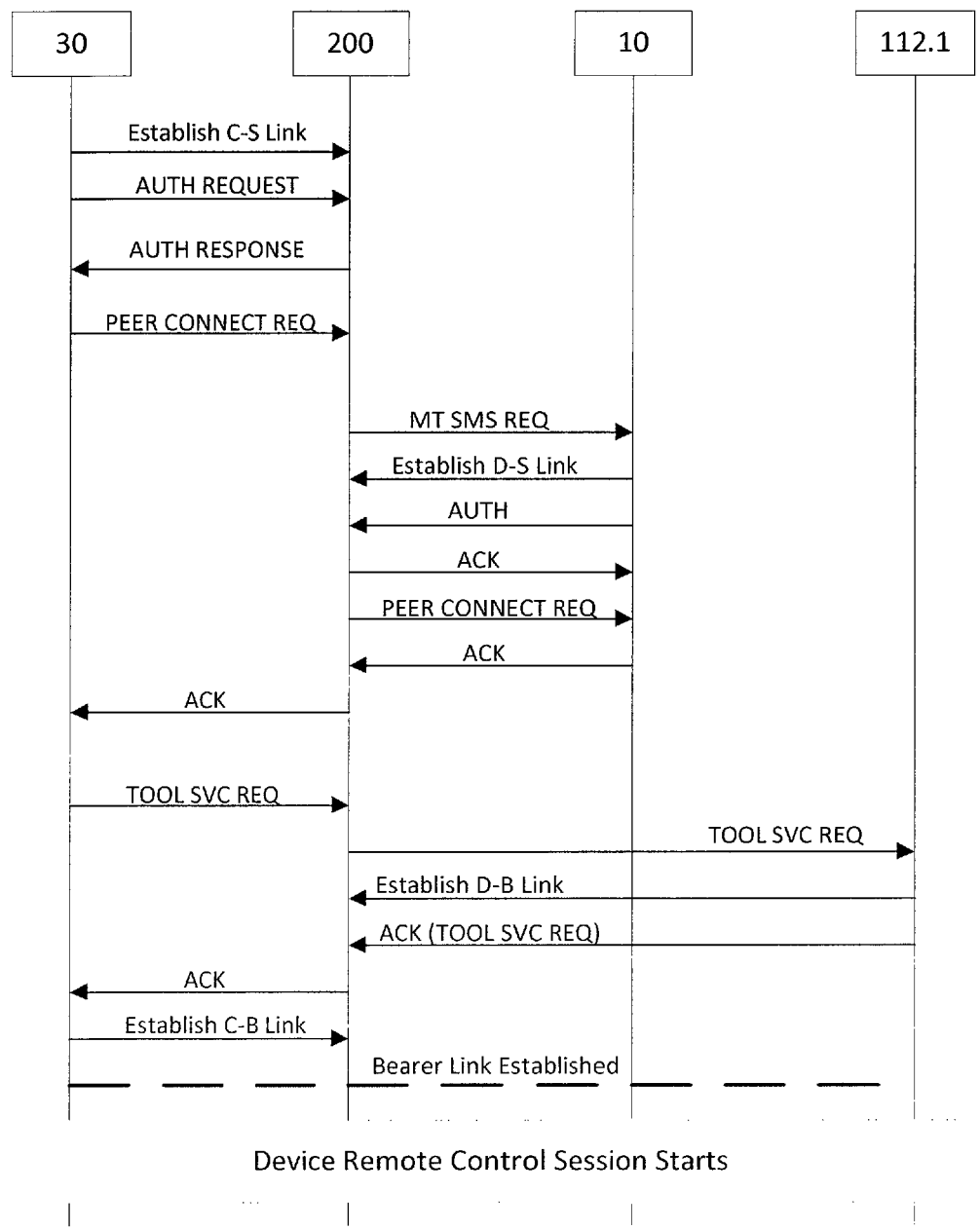
FIG. 9 illustrates the overall process of End-to-End VMM-RC Session establishment.

FIG. 9 illustrates the overall process of End-to-End VMM-RC Session establishment.

(a) CEG[200] receives C-S link connection request from Technician Console [30];

(b) Authentication Request is received by CEG [200] from the Technician Console [30];

(c) Authentication Response is sent by [200] to [30];

(d) PEER_CONNECT_REQ signal is received by [200] from [30];

(e) [200] sends a Mobile Terminated SMS to Device [10];

(f) [200] receives D-S link connection request from Device [10];

(g) Authentication Request is received by [200] from Device [10];

(h) Authentication Response is sent by [200] to Device [10];

(i) PEER_CONNECT_REQ signal sent by [200] to Device [10];

(j) ACK received by [200] from [10];

(k) ACK transmitted by [200] to Technician Console [30];

(l) TOOL_SVC_REQ received by [200] from [30];

(m) TOOL_SVC_REQ relayed by [200] to VMM_RC [112.1];

(n) [200] receives D-B link connection from [112.1];

(o) [200] receives ACK from [112.1] for the TOOL_SVC_REQ for step (m);

(p) ACK relayed by [200] to [30];

(q) [200] receives C-B link connection request from [30].

At this point, the control plane and bearer plane is/are established. VMM-RC bearer data is carried over the bearer channels (D-B and C-B)

Figure 10:
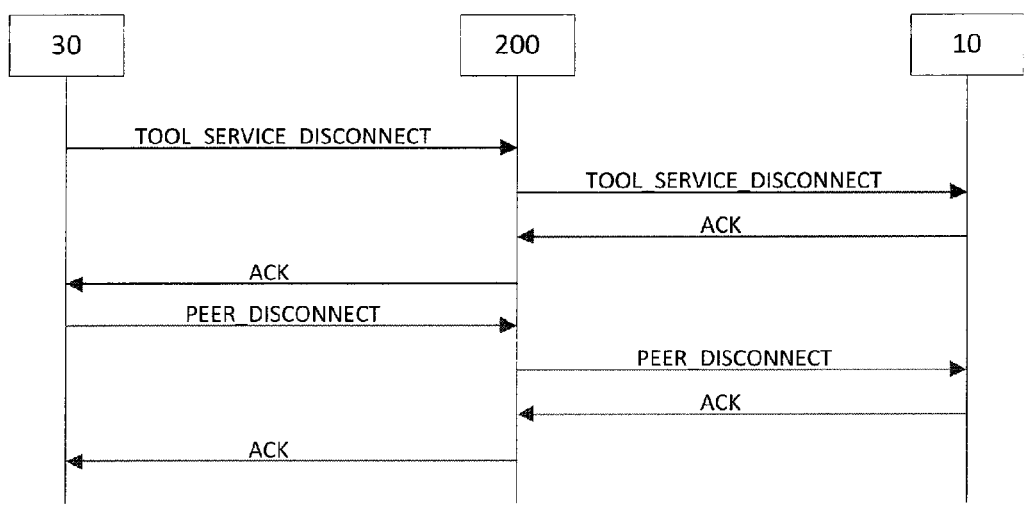
FIG. 10 illustrates the overall process of VMM-RC Session termination.

VMM-Remote Session Termination, referring to FIG. 10, the Technician, operating the Technician Console [30] initiates the VMM-RC service disconnection. The following sequence of events occurs:

(a) TOOL_SVC_DISCONNECT is received from Technician Console [30] by CEG[200];

(b) TOOL_SVC_DISCONNECT is relayed by [200] to Device [10];

(c) ACK is received by [200] from [10];

(d) ACK is relayed by [200] to Technician Console [30];

(e) PEER_DISCONNECT is received from Technician Console [30] by CEG[30];

(f) PEER_DISCONNECT is relayed by [200] to Device [10];

(g) ACK is received by [200] from [10]; and (h) ACK is relayed by [200] to Technician Console [30].

At this time, all channels are disconnected and the VMM-RC session is closed.

Remote troubleshooting while the users are roaming is always challenging since the roaming charges are always high and these troubleshooting sessions could go on for a long time. The usage of mobile data services is typically measured in kilobytes (KB) and megabytes (MB). Users are always apprehensive to use data while roaming and hence make the trouble shooting session non-trivial.

The current invention allows the customer care representative to know if the user is roaming or not before starting a VMM-RC session to avoid any additional data roaming charges that the user could incur.

During the VMM RC session the customer care representative is always notified whether the user is roaming or not. The VMM-RC client polls the network state on the mobile device to check for roaming during the following state changes: SID/NID; Channel Frequency; MCC/MNC. If any of the above state changes are TRUE then the VMM-RC client notifies the server and the customer care representative about the roaming state and disconnects the session immediately.

The VMM-RC session goes into a hibernating mode where the device client polls for certain duration to check if the device is still roaming. If the device is no more roaming then VMM-RC session reconnects to the server else it disconnects the client application. The customer care representative has to reconnect to the user's mobile device.

The current invention allows the customer care representative to know if the user is roaming or not before starting a VMM-RC session to avoid any additional data roaming charges that the user could incur. It makes the tool all the more powerful and foolproof since the user is always guaranteed that the user shall not incur any data roaming charges even if the user accidentally moves to a roaming zone during an ongoing session.

Figure 11:
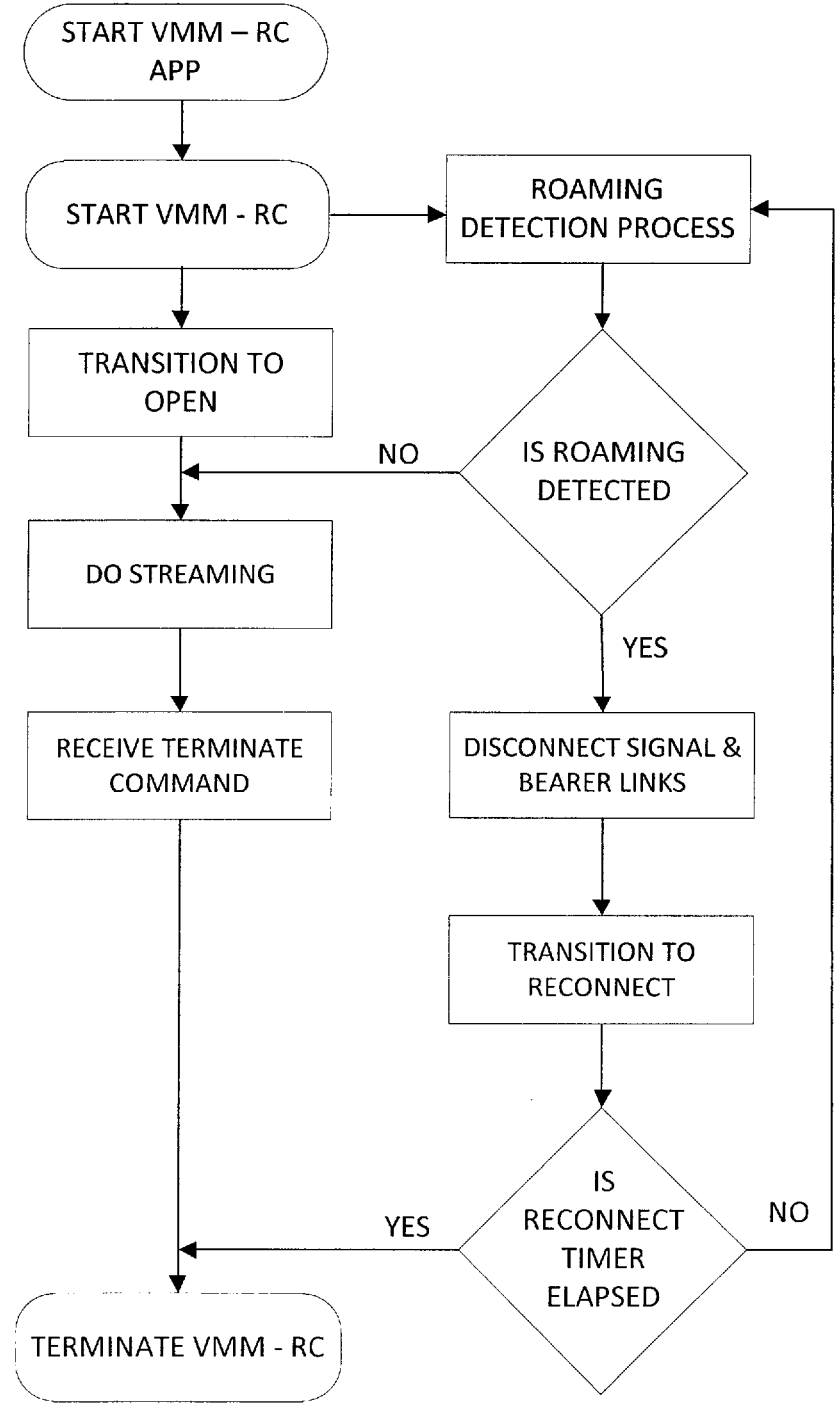
FIG. 11 is a flow diagram of the current invention.
Figure 12:
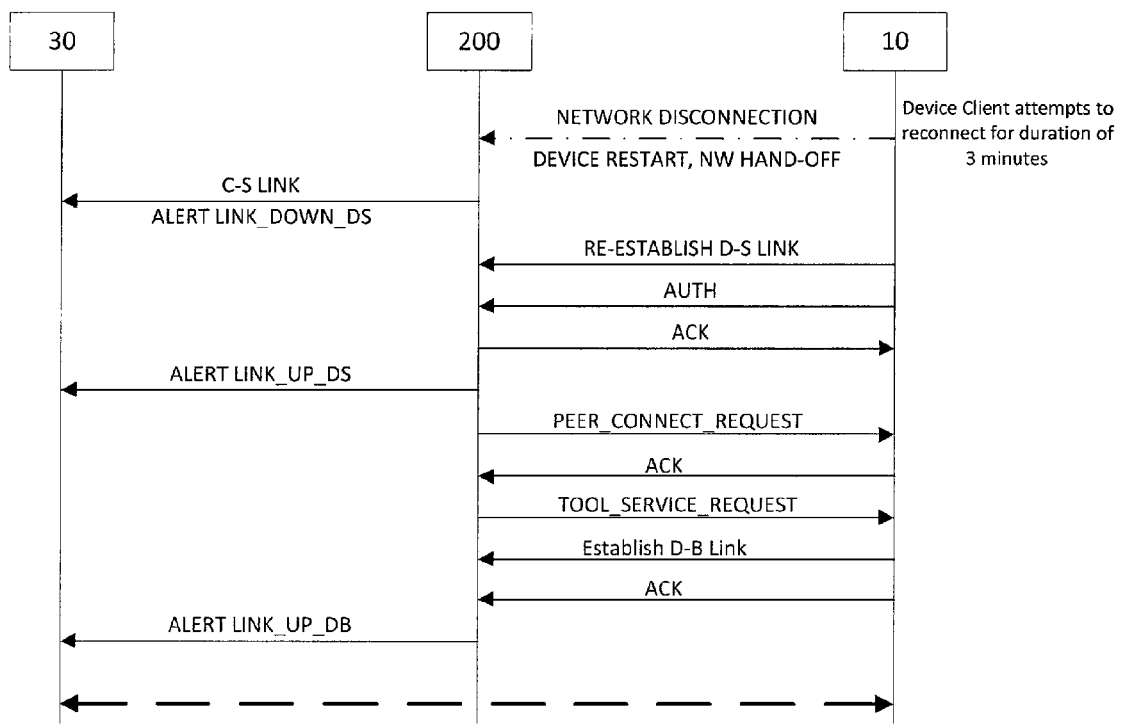
FIG. 12 illustrate the call flow of the current invention.

Referring to FIG. 11, the VMM-RC Roaming Detection flow process. The following sequence of process and conditions occurs:

(1) VMM-RC App starts
(2) VMM-RC Application Service starts.
(3) Roaming detection process starts
(4) Application protocol stack transitions to OPEN
(5) Roaming is detected, bearer link is disconnected
(6) If (5) is true, application protocol stack transitions to RECONNECT
(7) If (5) is false, Streaming continues
(8) If Reconnect Timer expires, application terminates
(9) If (8) is false, continue (5)
(10) If Terminate Command is received, application terminates FIG. 12 describes the call flow of the VMM-RC when roaming is detected on the device Pre-Condition
VMM-RC session is established
Call flow Procedures are as follows:

(11) When device [10] detects roaming, device [10] disconnects the bearer and signal links and transitions to RECONNECT state.
(12) CEG[200] detects the D-S link is down, and sends an ALERT (D-S LINK DOWN) to the Technician Console [30]
(13) When device [10] detects it is no longer roaming, it transitions to SETUP state and re-establishes the D_S link
(14) Authentication Request is received by [200] from Device [10]
(15) Authentication Response is sent by [200] to Device
(16) CEG [200] sends ALERT (D-S LINK UP) to 30
(17) PEER_CONNECT_REQ signal sent by [200] to Device [10]
(18) ACK received by [200] from [10]
(19) ACK transmitted by [200] to Technician Console [30]
(20) TOOL_SVC_REQ sent by [200] to VMM_RC [10]
(21) [200] receives D-B link connection from [10]
(22) [200] receives ACK from [10] for the TOOL_SVC_REQ
(23) [200] sends ALERT (DB_LINK_UP) to Technician Console[30]

At this time, the session is recovered and the VMM-RC resumes its normal operations.

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of determining mobile device roaming during a remote troubleshooting session, the method comprising:
establishing a remote troubleshooting session between a technician console and a mobile device, wherein the remote troubleshooting session enables the technician console to remotely view and control the mobile device and wherein the remote troubleshooting session uses dedicated communication channels between the technician console and the mobile device to stream data with respect to display capture, and key and touch input simulation;
receiving a network state change during an ongoing remote troubleshooting session, wherein the network state change indicates a roaming status for the mobile device;
placing the ongoing remote troubleshooting session in a hibernation state on a condition that the network state change indicates that the mobile device is roaming; and
reconnecting the remote troubleshooting session between the technician console and the mobile device on a condition that the mobile device is not roaming.

2. The method according to claim 1, further comprising: receiving the network state change in response to polling.

3. The method according to claim 1, wherein the remote troubleshooting session is end user initiated.

4. The method according to claim 1, wherein the remote troubleshooting session is console initiated.

5. The method according to claim 1, wherein the network state change is channel frequency.

6. The method according to claim 1, wherein the network state change is at least one of a system identification number and a network identification number change.

7. The method according to claim 1, wherein the network state change is at least one of a mobile network code and mobile country code change.

8. The method according to claim 1, further comprising: disconnecting the remote troubleshooting session upon receipt of the network state change.

9. The method according to claim 1, further comprising: automatically disconnecting the remote troubleshooting session upon receipt of the network state change.

10. The method according to claim 1, further comprising: polling the mobile device to determine if the mobile device is still roaming.

11. A method of determining mobile device roaming during a remote troubleshooting session, the method comprising:
establishing a remote troubleshooting session between a technician console and a mobile device, wherein the remote troubleshooting session enables the technician console to remotely view and control the mobile device and wherein the remote troubleshooting session uses dedicated communication channels between the technician console and the mobile device to stream data with respect to display capture, and key and touch input simulation;

receiving a network state change during an ongoing remote troubleshooting session in response to polling, wherein the network state change indicates a roaming status for the mobile device;

placing an ongoing remote troubleshooting session in a hibernation state on a condition that the network state change indicates that the mobile device is roaming; and reconnecting the remote troubleshooting session between the technician console and the mobile device on a condition that the mobile device is not roaming.

12. The method according to claim 11, further comprising:

receiving the network state change based on an event.

13. A method of determining mobile device roaming during a remote troubleshooting session, the method comprising:

establishing a remote troubleshooting session between a technician console and a mobile device, wherein the remote troubleshooting session enables the technician console to remotely view and control the mobile device and wherein the remote troubleshooting session uses dedicated communication channels between the technician console and the mobile device to stream data with respect to display capture, and key and touch input simulation;

determining if the mobile device is roaming during an ongoing remote troubleshooting session;

performing a disconnection action with respect to the ongoing remote troubleshooting session based on a condition that the mobile device is roaming, wherein the remote troubleshooting session enables remote view and control of the mobile device; and performing a reconnection of the remote troubleshooting session between the technician console and the mobile device on a condition that the mobile device is not roaming.

14. The method according to claim 13, wherein the disconnection action is disconnecting a bearer link and signal link.

15. The method according to claim 13, wherein roaming is determined by a network state change.

16. The method according to claim 13, wherein the network state change is channel frequency.

17. The method according to claim 13, wherein the network state change is at least one of a system identification number and a network identification number change.

18. The method according to claim 13, wherein the network state change is at least one of a mobile network code and mobile country code change.

19. The method according to claim 13, wherein the remote troubleshooting session is end user initiated.

20. The method according to claim 13, wherein the remote troubleshooting session is console initiated.

21. A system for determining mobile device roaming during a remote troubleshooting session, comprising:

a technician console configured to establish a remote troubleshooting session with a mobile device, wherein the remote troubleshooting session enables the technician console to remotely view and control the mobile device and wherein the remote troubleshooting session uses dedicated communication channels between the technician console and the mobile device to stream data with respect to display capture, and key and touch input simulation;

the technician console configured to receive a network state change during an ongoing remote troubleshooting session, wherein the network state change indicates a roaming status for the mobile device;

the technician console configured to place an ongoing remote troubleshooting session in a hibernation state on a condition that the network state change indicates that the mobile device is roaming; and the technician console configured to reconnect the remote troubleshooting session between the technician console and the mobile device on a condition that the mobile device is not roaming.

22. The system according to claim 21, further comprising:

the technician console configured to receive the network state change in response to polling.

23. The system according to claim 21, wherein the remote troubleshooting session is end user initiated.

24. The method according to claim 21, wherein the remote troubleshooting session is console initiated.

25. The system according to claim 21, wherein the network state change is channel frequency.

26. The system according to claim 21, wherein the network state change is at least one of a system identification number, network identification number change, a mobile network code and mobile country code change.

27. The system according to claim 21, further comprising:

the technician console configured to disconnect the remote troubleshooting session upon notice of the network state change.

28. A mobile device for determining mobile device roaming during a remote troubleshooting session, comprising:

the mobile device console configured to establish a remote troubleshooting session with a console, wherein the remote troubleshooting session enables the console to remotely view and control the mobile device and wherein the remote troubleshooting session uses dedicated communication channels between the technician console and the mobile device to stream data with respect to display capture, and key and touch input simulation; and the mobile device configured to transmit a network state change during an ongoing remote troubleshooting session, wherein the network state change indicates a roaming status for the mobile device, wherein the ongoing remote troubleshooting session is placed in a hibernation state on a condition that the network state change indicates that the mobile device is roaming, and wherein the ongoing remote troubleshooting session is reconnected between the technician console and the mobile device on a condition that the mobile device is not roaming.

29. The mobile device according to claim 28, further comprising:

the mobile device configured to transmit the network state change in response to polling.

* * * * *